United States Patent [19]

Waldmann

[11] 3,968,422

[45] July 6, 1976

[54] METHOD AND APPARATUS FOR THE STATIC COMPENSATION OF REACTIVE POWER

[75] Inventor: Hermann Waldmann, Weiher, Germany

[73] Assignee: Siemens Aktiengesellschaft, Munich, Germany

[22] Filed: Mar. 5, 1975

[21] Appl. No.: 555,540

[30] Foreign Application Priority Data

Mar. 27, 1974 Germany............................ 2414807

[52] U.S. Cl.................................. 323/102; 13/12; 323/109; 323/119
[51] Int. Cl.² .......................................... H02J 3/18
[58] Field of Search ............... 13/12; 323/6, 8, 101, 323/102, 105, 106, 108–110, 119, 120–122, 124, 126–128

[56] References Cited
UNITED STATES PATENTS

| | | |
|---|---|---|
| 3,551,799 | 12/1970 | Koppelmann.................... 323/127 X |
| 3,754,184 | 8/1973 | Stone................................ 323/119 X |
| 3,829,736 | 8/1974 | Schirman........................... 323/8 X |
| 3,829,759 | 8/1974 | Thorborg............................ 323/119 |

*Primary Examiner*—A. D. Pellinen
*Attorney, Agent, or Firm*—Kenyon & Kenyon Reilly Carr & Chapin

[57] ABSTRACT

A method and apparatus for the static compensation of reactive power using controlled reactive power converters having control variables derived from the phase load currents in which the phase load currents are converted into a line frequency oscillation and two rotating current vectors derived from each of the line frequency components, with the current vector components then transformed into d-c quantities by addition to a system vector to form a co-rotating and counter-rotating vector, from the components of which control variables of the reactive power converter are formed.

6 Claims, 12 Drawing Figures

V.I. = VECTOR IDENTIFIER
V.R. = VECTOR ROTATOR
V.A. = VECTOR ANALYZER
C.U. = CONTROL UNIT

METHOD AND APPARATUS FOR THE STATIC COMPENSATION OF REACTIVE POWER

BACKGROUND OF THE INVENTION

This invention relates to the static compensation of reactive power in a three phase system in using converters in general, and more particularly to an improved method and apparatus for carrying out such static compensation using control variables for the reactive power converters which are derived from load currents.

With the recent availability of reactive power converters, the common manner of obtaining reactive power compensation using rotating machines has been replaced to a large extent. Typically, in a system where reactive power compensation is required, a capacitor battery, for the three phases, and a three phase set of converters having short circuited, controlled reactive converters are employed. It is well known that short circuited converter constitutes a reactive power load with the reactive power consumption depending on the control angle of the converter rectifiers. In an installation such as this with capacitor batteries and converters the capacitor battery is designed so that it can compensate for the maximum reactive power. The short time fluctuations of reactive power are compensated for by the reactive power converter.

An application in which it is particularly difficult to compensate for reactive power is in electric furnaces. Such furnaces due to their design and operational behavior cause considerable fluctuations of active and reactive power. In addition, these power fluctuations are not distributed symetrically over the individual phases of the three phase system supplying the furnace.

Various means for operating a reactive power compensating device are known. In the method disclosed in Siemens Zeitschrift, 1973, pages 706 to 711 the control variables for the reactive power converter are derived from the measured reactive power. Reactive power is controlled by means of two series connected control loops, namely, an inner current control loop and an outer reactive power control loop which supplies the control variables for the converter. This control concept requires an expensive means for determining reactive power using multiplication of the line current by a voltage which is orthogonal to the respective phase voltage. In addition, smoothing of the determined value of reactive power must be provided. This smoothing results in time constants which are troublesome particularly in compensating occurring reactive power pulses. Separate control for the individual phases of the three phase system supplying the load is not possible with this known method.

In the article "The Generation of Reactive Power by Synchronous Machines" by G. Hosemann VDE-Verlag Berlin, 1963, pages 121 and 122, an arrangement for connecting an arc furnace, which is an asymmetrical load, together with a set of balancing reactive power machines to the three phase system is disclosed. In order to compensate for the counter-rotating current component, the rotor of one reactive power machine is driven in the counter-rotating sense and is equipped with two mutually orthogonal windings. Each of the windings is excited by means of a converter whose control variables are the components of the counter-rotating load current. The voltage fluctuations caused by the co-rotating component of the load are compensated by a driving synchronous motor used as an additional reactive power machine. The co-rotating and the counter-rotating current components are determined using a component bridge. This previously developed reactive power compensation system requires an expensive set of machines, i.e., requires two reactive power machines. The compensation of reactive power fluctuations still occurs relatively slowly when the reactive power machines are excited by means of static converters.

In view of these various difficulties the need for an improved static reactive power compensation system which permits balancing the reactive power in each of individual phases of the supply system and which permits rapid compensation of changes of reactive power which occur suddenly is evident.

SUMMARY OF THE INVENTION

The present invention provides such a system. According to the present invention the control variables for the reactive power converters are derived from the load currents in a series of steps as follows:
 a. the load currents are converted into a line frequency oscillation with orthogonal components;
 b. from each of the orthogonal components of the oscillation, two current vectors rotating with the line frequency are identified;
 c. the components of the current vectors are transformed into d-c quantities through addition to the components of a vector derived from one phase of the three phase system;
 d. from the d-c quantities, a co-rotating vector and a counter-rotating vector are formed;
 e. the orthogonal components of the counter-rotating vector and the reactive current component of the co-rotating vector are converted into the control variables used in the reactive power converter.

In the method of the present invention, the process steps c and d above can be interchanged.

The present invention in its implementation starts out with a converter set having single phase controllable reactive power converters for the balancing and rapid compensation of the reactive power. The individual reactive power converters are designed, for example, as separately controllable a-c control elements. By controlling the individual converters differently, reactive currents of different magnitude can be compensated in the individual phases of the three phase system. The necessary control variables for the reactive power converter are derived from the load currents in the manner described above. In accordance with the method steps outlined above, means are provided for developing two vectors rotating in opposite directions, i.e., a co-rotating vector and a counter-rotating vector, and for subsequently converting the components thereof into control variables for the reactive power converter.

BRIEF DESCRIPTION OF THE DRAWINGS

FIG. 3b is a schematic diagram of the circuit of FIG. 3a.

FIG. 4b is a curve illustrating the frequency response of the circuit of FIG. 4a.

DETAILED DESCRIPTION OF THE PREFERRED EMBODIMENT

Figure 1:
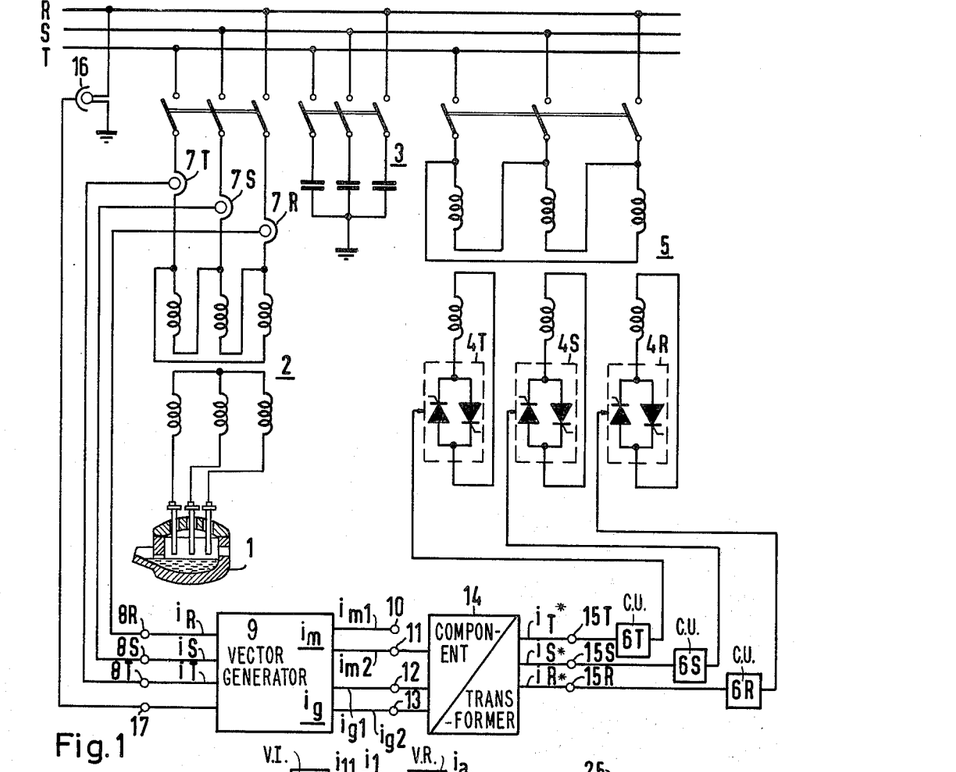
FIG. 1 is a block diagram of a reactive power compensation system in accordance with the present invention.

FIG. 1 illustrates a reactive compensation system according to the present invention. Illustrated is an arc furnace 1 which forms a three phase load. The arc furnace is coupled to the three phase lines designated R, S and T through a three phase transformer 2. As it is well known, the arc power of the individual electrodes in the arc furnace is influenced by changes of arc distance when melting down scrap. This can cause sudden fluctuations of the active and reactive power which are distributed asymmetrically over the individual phases. For compensation of the reactive power there is provided a capacitor battery 3 and a converter set having three individual reactive power converters 4R, 4S and 4T respectively. These are connected with the three phases R, S and T through a three phase converter transformer 5. In addition, chokes may be inserted for limiting the current. However, the converter transformer can be designed with a high enough stray inductance that additional chokes are not needed. The reactive power converters 4R through 4T are fed by control units 6R, 6S and 6T, respectively which have as their input control variables $i_R^*$, $i_S^*$, and $i_T^*$.

The remainder of the circuits includes means for determining these control variables. The load currents $i_R$, $i_S$, $i_T$ of the three phase currents on the primary side of transformers 2 are measured by means of current transformer 7T, 7S, and 7R. The outputs of the current transformers are fed to the terminals 8R, 8S, and 8T of a vector generator 9. Between the phase R and ground, the phase voltage is obtained from a voltage transformer 16 and fed to the input terminal 17 of vector generator 9. The vector generator 9 uses the load currents $i_R$, $i_S$ and $i_T$ to form the components of a co-rotating vector $i_m$ and the components of a counter-rotating vector $i_g$. Since the compensating device permits only generating reactive currents, the component $i_{m1}$ of the co-rotating vector $i_m$ appearing at terminal 10 and representing the active load current is not further processed. Only its component $i_{m2}$ appearing at terminal 11 and representing the reactive current is used. The output components $i_{g1}$, $i_{g2}$ and $i_{m1}$ are fed to the terminals 12, 13 and 11 respectively of a component transformer 14. The component transformer 14 uses this information to form the control variables $i_R^*$, $i_S^*$ and $i_T^*$ and provide them as outputs at the terminals 15T, 15S and 15R.

Figure 2:
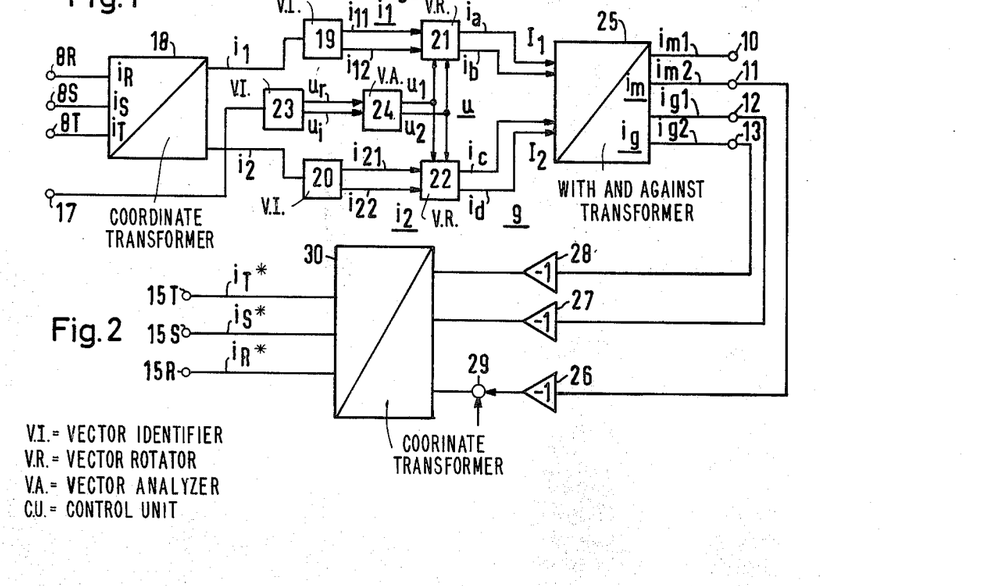
FIG. 2 is a block diagram of the vector generator and component transformer of FIG. 1.

FIG. 2 is a block diagram illustrating, in more detail, the vector generator 9 and component transformer 14. Its input at terminals 8R, 8S and 8T are fed to a 3/2 coordinate transformer 18 to be described in more detail below in connection with FIG. 3. It converts the load currents $i_R$, $i_S$ and $i_T$ into a line frequency oscillation with orthogonal components $i_1$ and $i_2$. These respective outputs are provided as inputs to vector identifiers 19 and 20 to be described below in connection with FIG. 4. The vector identifiers add to the oscillation components $i_1$ and $i_2$ respective oscillation components which lag by 90°. The vector identifier 19 forms a current vector $\underline{i_1}$ made up of the components $i_{11}$ and $i_{12}$ rotating with the line frequency. The vector identifier 20 forms a current vector $\underline{i_2}$ also rotating with the line frequency and having the component $i_{21}$ and $i_{22}$. The voltage input at terminal 17 is provided to a further vector identifier 23 which adds an oscillation component lagging by 90° to the voltage between phase R and ground. Vector identifier 23 thus develops an output having components $u_r$ and $u_j$ which are fed through a vector analyzer 24, to be described in more detail in connection with FIG. 6. It then provides outputs $u_1$ and $u_2$ of the voltage vector $\underline{u}$. The outputs of the vector identifiers 19 and 20 are fed respectively to vector rotators 21 and 22 to be described in more detail below in connection with FIG. 5. These vector rotators transform the current vectors $\underline{i_1}$ and $\underline{i_2}$ into d-c quantities $i_a$ and $i_b$ and $i_c$ and $i_d$ by a continuous addition of the system vector $\underline{u}$ obtained from the vector analyzer 24. In other words, the vector rotator 21 takes the components of the current vector $\underline{i_1}$ and the components of the system vector 4 and forms therefrom the components $i_a$ $i_b$ of a vector $I_1$. In a similar fashion, the vector rotator 21 forms the components $i_c$ and $i_b$ of a vector $I_2$.

The output signals $i_a$ through $i_d$ of the two vector rotators 21 and 22 are the d-c quantities which are fed as inputs to a "with-and-against" transformer 25 to be described in more detail in connection with FIG. 7. From these inputs, transformer 25 forms the components $i_{m1}$ and $i_{m2}$ of the corotating vector $i_m$ providing them as outputs at terminals 10 and 11. It also forms the component $i_{g1}$ and $i_{g2}$ of the counter-rotating vector $i_g$ at terminals 12 and 13. The quantities $i_{m2}$, $i_{g1}$ and $i_{g2}$ are inverted through inverting amplifiers 26, 27 and 28 and then determine the desired operating point of the compensating device. If the current transformer 7R, 7S and 7T are arranged so that they measure the load currents without taking into account the currents in the capacitor battery, an additional summing junction 29 is provided at which a constant voltage corresponding to the current in the capacitor battery 3 is added to the reactive component $i_{m2}$ of the co-rotating vector $i_m$. Where, however, the transformers 7R, 7S and 7T are arranged to directly measure the current in the lines of the three phase system and take into consideration the influence of the capacitor battery 3, the summing junction 29 will not be necessary. The outputs of the amplifiers 26, 27 and 28 are coupled to a coordinate transformer 30 described in detail below in connection with FIG. 8. Coordinate transformer 30 converts the two components of the counter-rotating vector and the reactive components of the co-rotating vector into the control variable $i_R^*$, $i_S^*$ and $i_T^*$. These control variables, which appear at the terminals 15R, 15S and 15T, are then fed the control units 6R, 6S and 6T associated with the individual reactive power converters 4R, 4S and 4T shown on FIG. 1.

Figure 3A:
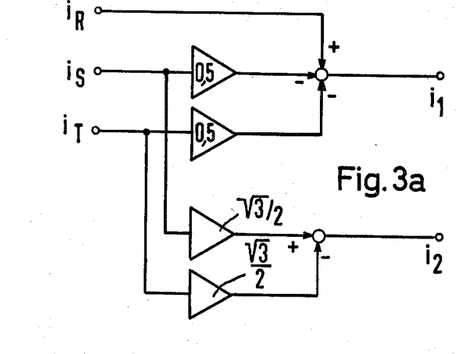
FIG. 3a is a functional diagram of a 3/2 coordinate transformer.
Figure 3B:
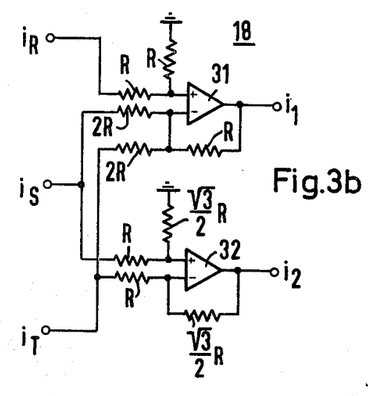

FIGS. 3a and 3b illustrate circuit diagrams of the coordinate transformer 18 of FIG. 2. This is a well known circuit described in "Circuits For the Conversion Between Component Systems For Three Phase Networks", a doctoral dissertation at the Technical University, Stuttgart, 1962 by M. Erche. In this circuit the three phase load currents are converted into an oscillation with orthogonal components. The orthogonal components $i_1$ and $i_2$ of the oscillation are generated from the load currents $i_R$, $i_S$ and $i_T$ according to the equations 1a and 1b as follows:

$$i_1 = i_R - 0.5\, i_S - 0.5\, i_T \tag{1a}$$

$$i_2 = (\sqrt{3/2})\, i_S - (\sqrt{3/2})\, i_T \tag{1b}$$

FIG. 3a illustrates in schematic form a direct implementation of these equations using operational amplifiers set to the gains indicated.

The implementation of this scheme into an actual circuit is illustrated on FIG. 3b. As shown, only two operational amplifiers 31 and 32 are required. The scaling of their input and feedback resistors is indicated. Such scaling will result in an implementation of the above equation. That is to say, the input resistor for the component $i_r$ at amplifier 31 which develops $i_1$ has a relative value R whereas the input resistor for the component $i_T$ has a relative resistance 2R as does the input resistor $i_S$. The feedback resistor has a relative value of R. The components $i_S$ and $i_T$ are provided to the inverting terminal and the component $i_R$ to the non-inverting terminal. This scaling between feedback and input results in the equation 1a above being implemented. Similarly, the output $i_2$ is obtained by feeding the values $i_T$ through an input resistor R to the inverting terminal and the quantity $i_S$ through another input resistor R to the non-inverting terminal of amplifier 32. To obtain a multiplication by the square root of 3, the feedback resistor is assigned a value of $\sqrt{3}/2R$.

Figure 4A:
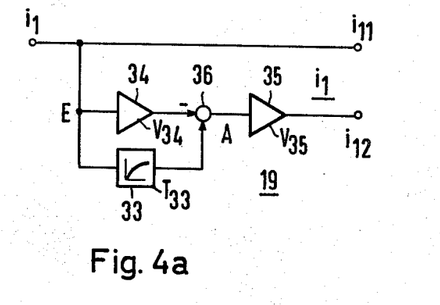
FIG. 4a is a block diagram of a vector identifier.
Figure 4B:
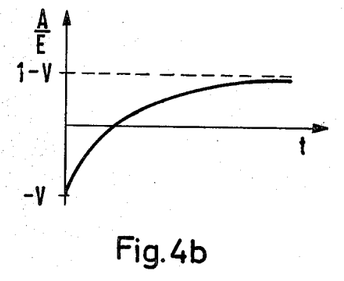

FIG. 4 is a schematic diagram of a vector identifier. Shown is the vector identifier 19 of FIG. 2. However, it will be recognized that the vector identifiers 20 and 23 will be of identical construction. The vector identifier has as an input the quantity $i_1$. This quantity is provided directly as the output $i_{11}$. It is also fed to the input of an operational amplifier 34. The purpose of the vector identifier is to determine the amplitude and phases of an oscillation of known frequency. A vector identifier generates from a scalor input variable the two orthogonal components of the rotating vector. The scalor input forms one orthogonal component of the rotating vector directly from the input and the other component is derived therefrom. Thus, the one component is the same as the input, i.e., $i_1 = i_{11}$. To derive the second component, the input $i_1$ is coupled through delay means 33 having a time constant $T_{33}$. The output from the delay device is found at a summing junction 36 with the output of the amplifier 34 also having as an input the quantity $i_1$. The amplifier 34 has a gain $V_{35}$ to develop as an output the quantity $i_{12}$. On the Figure the output from the summing junction 36 is designated A and the input as E. The transfer function between these points will be as follows:

$$\frac{A}{E} + \frac{1}{1+pT_{33}} V_{34} = \frac{1 - V_{34} - pT_{33} \cdot V_{34}}{1 + pT_{33}}$$

In order to obtain a phase shift of 30° with a line frequency of 50 Hz, the gain $V_{34}$ can be set, for example, to 0.866, the gain $V_{35}$ to 2 and the time constant $T_{33}$ to 1.8 ms.

Figure 5:
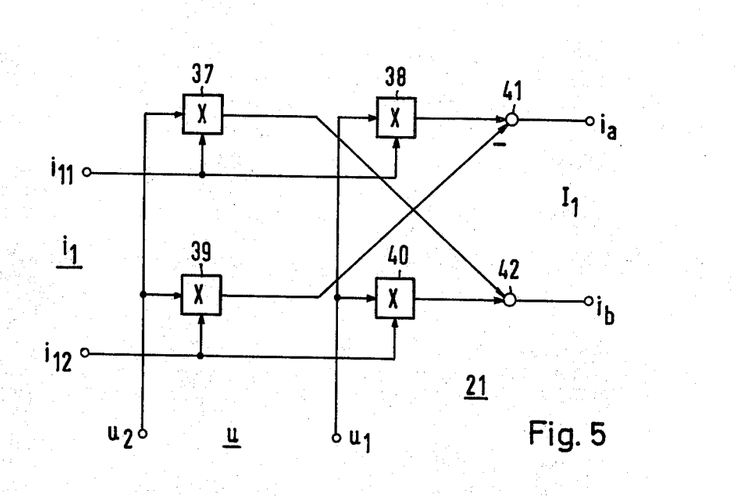
FIG. 5 is a schematic diagram of a vector rotator.

FIG. 5 illustrates a vector rotator such as the vector rotator 21 of FIG. 2. Vector rotator 21 is used as an example although it will be recognized that vector rotator 22 will be identical. Vector rotator 21 transforms the components $i_{11}$ and $i_{12}$ of the current vector $i_1$ into d-c quantities $i_a$ and $i_b$. To accomplish this the voltage vector $\underline{u}$ is continuously added to the current vector $i_1$.

As illustrated the vector rotator 21 includes four multipliers 37, 38 39 and 40 along with two adders or summing junctions 41 and 42. Multipliers 37 and 38 have as one input the component $i_{11}$ and multipliers 39 and 40 have as one input the component $i_{12}$. The second input to multipliers 37 and 39 is the component $u_2$ and the second input to multipliers 38 and 40 the component $u_1$. The output signals of the multipliers 39 and 38 are added in a summing junction or adder 41 and the output of the multipliers 37 and 40 in the summing junction 42. All quantities are added in a positive sense except the output of the multiplier 39 which is added negatively. The result at the outputs of the summing junctions 41 and 42 are the components $i_a$ and $i_b$ of the vector $I_1$. In similar fashion the vector identifier 22 forms a vector $I_2$ using the components $i_{21}$ and $i_{22}$ of the current vector $i_2$ and the components $u_1$ and $u_2$ of the system vector $\underline{u}$.

As noted above, the system vector $u$ is developed in a further vector identifier 23 having as an input the voltage between the phase R of the three phase system and ground. It operates in the manner described in connection with FIG. 4 to form two components $u_r$ and $u_j$ of a line frequency reference oscillation $\underline{U}$.

Figure 6:
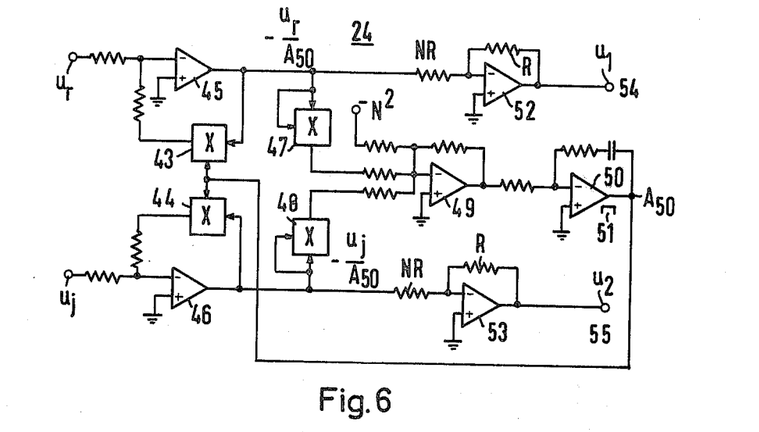
FIG. 6 is a schematic diagram of a vector analyzer.

To obtain the quantities $u_1$ and $u_2$ these components $u_r$ and $u_j$ are provided as inputs to the vector analyzer 24 shown on FIG. 6. The inputs $u_r$ and $u_j$ are provided through input resistors to amplifiers 45 and 46 respectively. In their feedback paths are multipliers 43 and 44 respectively in series with feedback resistors. The output voltages of the amplifiers 45 and 46 are then squared in multipliers 47 and 48 respectively. They are then compared or added at the input of the summing amplifier 49, through appropriate input resistors with a normalized negative voltage $-N^2$. The output of the summing amplifier is coupled through a resistor to the input of an integrator 50. The output voltage of the integrator 50 is unilaterally limited to zero by means of a limiter 51 shown schematically. Typically this could be in the form of limiting diodes which are well known. The output therefrom designated $A_{50}$ provides the second input to the multipliers 43 and 44. Because of the feedback action of the multipliers 43 and 44 the voltage $-u_r/A_{50}$ appears at the output of amplifier 45 and the voltage $-u_j/A_{50}$ at the output of amplifier 46. The integrator 50 will have no change in its output voltage when its input voltage becomes zero, i.e., the following equation holds:

$$A_{50} = \frac{1}{N}\sqrt{u_r^2 + u_j^2}$$

The output voltages of the amplifiers 45 and 46 are fed to inverting feedback amplifiers 52 and 53, respectively having feedback resistances in the ratio to their input resistances of 1:N. At the output terminal 54 and 55 of these amplifiers the components $u_1$ and $u_2$ of a unity vector which always points in the direction of the system vector R obtained.

Figure 7:
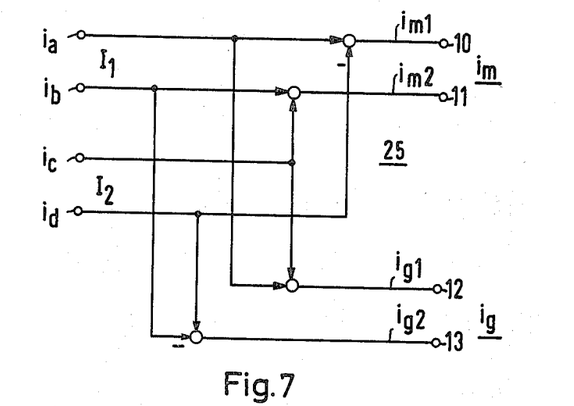
FIG. 7 is a schematic presentation of a "with-and-against" transformer.

FIG. 7 illustrates schematically "with-and-against" transformer 25 which transforms the components $i_a$ to $i_d$ of the two vectors $I_1$ and $I_2$ into the components of a co-rotating vector $\underline{i_m}$ and a counter-rotating vector $\underline{i_g}$.

To derive this transformation the vectors $I_1$ and $I_2$ are written as oscillations as follows:

$$I_1 = \begin{bmatrix} i_a \\ i_b \end{bmatrix} = \begin{bmatrix} a_1 \cdot \cos(\omega t + \phi_1) \\ a_2 \cdot \cos(\omega t + \phi_1) \end{bmatrix} \quad (4a)$$

$$I_2 = \begin{bmatrix} i_c \\ i_d \end{bmatrix} = \begin{bmatrix} a_1 \cdot \sin(\omega t + \phi_1) \\ a_2 \cdot \sin(\omega t + \phi_1) \end{bmatrix} \quad (4b)$$

Through transformation of these matrices, the following is obtained:

$$I_1 = \begin{bmatrix} i_a \\ i_b \end{bmatrix} =$$

$$\tfrac{1}{2}\begin{bmatrix} a_1 \cdot \cos(\omega t + \phi_1) \\ a_1 \cdot \sin(\omega t + \phi_1) \end{bmatrix} + \tfrac{1}{2}\begin{bmatrix} a_1 \cdot \cos\{-(\omega t + \phi_1)\} \\ a_1 \cdot \cos\{-(\omega t + \phi_1)\} \end{bmatrix}$$

$$+ \tfrac{1}{2}\begin{bmatrix} a_2 \cdot \sin(\omega t + \phi_2) \\ a_2 \cdot \cos(\omega t + \phi_2) \end{bmatrix} + \tfrac{1}{2}\begin{bmatrix} a_2 \cdot \sin-(\omega t + \phi_2) \\ a_2 \cdot \cos-(\omega t + \phi_2) \end{bmatrix} \quad (5)$$

In equation 5 the first and fourth terms on the right hand side contain a vector which in the mathematical sense rotates positively and the second and third terms contain a vector counter-rotating, in the mathematically negative sense. From this the co-rotating and counter-rotating vectors are obtained, in accordance with the equation as follows:

$$\underline{i_m} = \begin{bmatrix} i_{m1} \\ i_{m2} \end{bmatrix} = \tfrac{1}{2}\begin{bmatrix} i_a & -i_d \\ i_b & i_c \end{bmatrix} \quad (6a)$$

$$\underline{i_g} = \begin{bmatrix} i_{g1} \\ i_{g2} \end{bmatrix} = \tfrac{1}{2}\begin{bmatrix} i_a & i_d \\ -i_b & i_c \end{bmatrix} \quad (6b)$$

The "with-and-against" transformer 25 shown in FIG. 7 implements the equation 6a and 6b. As illustrated it forms, from the input variables $i_a$ through $i_d$, through summation, the components $i_{m1}$ and $i_{m2}$ of the co-rotating vector and components $i_{g1}$ and $i_{g2}$ of the counter-rotating vector. The actual implementation of what is shown on FIG. 7 can be simply implemented using operation amplifiers much in the manner that the implementation shown on FIG. 3b is carried out. For example, the quantity $i_a$ would be fed to the non-inverting input of an amplifier and the quantity $i_d$ to the inverting input to obtain the input $i_{m1}$. The necessary scaling would be obtained by having the proper ratio between input and feedback resistances in conventional fashion.

It can be readily demonstrated mathematically that the order of the vector rotators 21 and 22 and the transformer 25 can be interchanged. In such a case the components of the current vectors $i_1$ and $i_2$ from the invector identifiers 19 and 20 would first be converted into co-rotating and counter-rotating vectors and these vectors then transformed into d-c quantities through the addition of a system vector.

Figure 8:
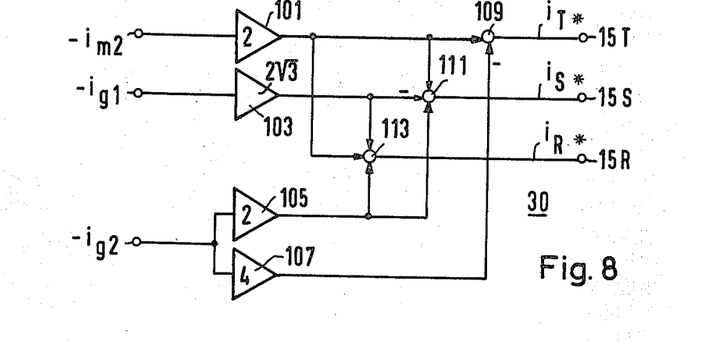
FIG. 8 is a schematic diagram of a coordinate transformer.

FIG. 8 is a schematic illustration of the coordinate transformer 30 of FIG. 2 which transforms the components $i_{g1}$ and $i_{g2}$ of the counter-rotating vector $i_g$ and the component $i_{m2}$ of the co-rotating vector $i_m$ into the control variables $i_R^*$, $i_S^*$ and $i_T^*$ to provide inputs to the reactive power converters is shown. The transformation is accomplished in a well known manner according to the equation as follows:

$$i_R^* = 2 \cdot \sqrt{3} \cdot i_{g1} + 2 \cdot i_{g2} + 2 \cdot i_{m2} \quad (7a)$$

$$i_S^* = -2 \cdot \sqrt{3} \cdot i_{g1} + 2 \cdot i_{g2} + 2 \cdot i_{m2} \quad (7b)$$

$$i_T^* = -4 \cdot i_{g2} + 2 \cdot i_{m2} \quad (7c)$$

The coordinate transformer 30 includes four amplifiers with the indicated gain along with the summing junctions or adders for adding the output voltages thereof. Thus, the input $-i_{m2}$ is multiplied by 2 in an amplifier 101, the quantity $-i_{g1}$ by $2 \times \sqrt{3}$ in an amplifier 103 and the quantity $-i_{g2}$ by 2 in an amplifier 105 and by 4 in an amplifier 107. At the summing junction 109 the output of amplifier 101 has subtracted from it the output of amplifier 107 to obtain the quantity $i_T^*$. At the summing junction 111 the output of amplifiers 101 and 105 are added and the output of amplifier 103 subtracted therefrom to develop the quantity $i_S^*$. At summing junction 113 the output of amplifiers 101, 103 and 105 are added to obtain the quantity $i_R^*$. This arrangement can be implemented using summing amplifiers and proper scaling of feedback and input resistances in the same manner in which the functional representation of FIG. 3a is implemented in the circuit of FIG. 3b.

In static reactive current compensation of this nature, the reactive currents produced can only be within the operating range of the reactive power converter. The upper limit of the operating range is reached when it is fully driven. If a larger current value is demanded, either part of the balance or part of the reactive power compensation or both must be given up. Similarly, the lower limit of the operating range is determined by the fact that the reactive power converter can reduce its current to zero but cannot reverse it.

In order to achieve the greatest possible balance and compensation of the reactive power even in the presence of heavy reactive power fluctuations, one embodiment of the present invention carries out a multiplication of the two components of the counter-rotating vector and the reactive component of the co-rotating vector by correction factors which are formed from the extreme values of the control variables determined by comparison with corresponding permissible current values. If a current which is too large or too small is demanded of a reactive power converter, the two components of the counter-rotating vector and the reactive component of the co-rotating vector are reduced to the extent that the permissible current value is not exceeded.

Figure 9:
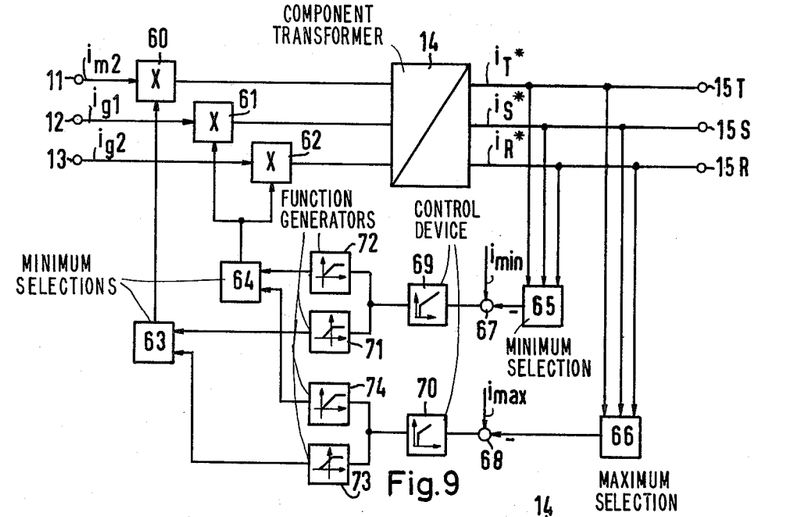
FIG. 9 is a block diagram of a correction arrangement for limiting the control variables.

FIG. 9 illustrates a block diagram of such an arrangement. Minimum selection means 65 and maximum selection means 66 are used to select the smallest and largest control variables from the control variables $i_R^*$, $i_S^*$ and $i_T^*$ which are being fed to the reactive power converters. The difference between the predetermined minimum permissible current value $i_{min}$ and the selected smallest control variable is determined at a summing junction 67 whose output is used to drive a minimum control device 69. Similarly, the output of the maximum selection means 66 is compared at a summing junction 68 with an input $i_{max}$ and the output used to drive a maximum control device 70. As long as the selected largest and smallest control variables are within the operating range of the reactive power converter, there will be present at the input of the control devices 69 and 70 inputs which will drive these control devices to their limit. The output signals of the control devices 69 and 70 are fed through function generators 71 through 74 to additional minimum selection means 63 and 64. The characteristic of the function generator 72 through 74 is that of a linearly rising output with input voltage with a break at which point the output voltage is held constant. The constant output voltage in the horizontal portion of the characteristic corresponds to a correction factor of 1. Since in most applications, reactive power compensation is more important than balancing the reactive power, the curve generators 72 and 74 have a characteristic containing breaks which are shifted relative to the break points of these function generators 71 and 73 in the positive direction.

As long as the control variables demanded fall within the operating range of the reactive power converter, the control devices 69 and 70 are fully driven. All of the function generators will have an output signal which corresponds to a correction factor of 1. These outputs after being fed through the means 63 and 64 are provided to multipliers 60, 61 and 62, one being interposed in each of the lines on which the input variables $i_{m2}$, $i_{g1}$ and $i_{g2}$ are found. For a correction factor of 1 the inputs will be so multiplied and will not be changed. However, if a demanded control variable exceeds the maximum permissible current value $i_{max}$, the output voltage of the control device 70 will decrease and eventually fall below the break point in the characteristic of the function generator 74. Thus, the output voltage of the function generator will now be below the value corresponding to a correction factor of 1. The minimum selection means 64 will select this value as the smaller of its inputs and will provide it as an input to the multipliers 61 and 62 which will thereupon reduce their output magnitude accordingly. The balance of the reactive power generated is thus reduced.

If, even after this step is taken, the demanded largest control variables is still outside the operating range of the corresponding reactive power converter, the break point of the curve generator 73, which is at a lower value, will then be crossed. The output of this curve function generator 73 will then also correspond to a correction factor smaller than 1. This correction factor will be selected by the selection means 63 and will be provided as an input to the multiplier 60. The component $i_{m2}$ will thus be reduced correspondingly. And, as a result, the required reactive compensation power will be reduced. The circuit operates in similar fashion when a control variable falls below the minimal permissible current value $i_{min}$.

The control devices 69 and 70 can simply be operational amplifiers biased such that they are in saturation as long as the outputs of the respective summing junction 67 and 68 indicate that the pre-established limits are not exceeded and so that their outputs decrease linearly if these values are exceeded. The function generator 71 through 74 may simply be operational amplifiers which are limited by means of Zener diodes or the like at the required break point. As such, once their output reaches the Zener voltage it will be limited to the voltage corresponding to a correction factor of one. Below that voltage, their outputs will decrease linearly in accordance their inputs. The minimum and maximum selections means may simply be diode arrangements connected in a well known fashion.

Figure 10:
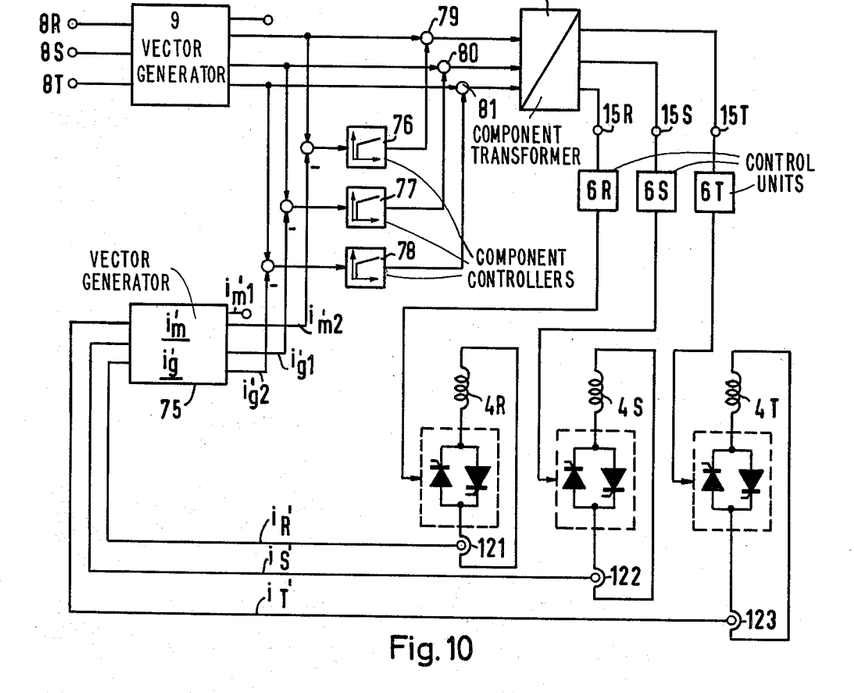
FIG. 10 is a circuit diagram of a compensating arrangement with additional component controllers in accordance with the present invention.

FIG. 10 illustrates an arrangement which permits a faster response to changes in reactive power fluctuations. Current transformers 121, 122 and 123 are used to determine the currents $i_R'$, $i_S'$ and $i_T'$ in the reactive power converters 4R, 4S and 4T. These are provided as inputs to an additional vector generator 75 corresponding to the vector generator 9 described above. The outputs of vector generator 9 and those of vector generator 75 are differenced in a plurality of summing junctions at the inputs to component controllers 76, 77 and 78 which may be simply proportional integral controls, i.e., operational amplifier integrators. The outputs on the controllers 76, 77 and 78 are then provided to the summing junctions 79, 80 and 81 where they are summed with the direct outputs from the vector generator 9 and provided as inputs to the component transformer 14. Through this additional measure a particularly rapid compensation of reactive power fluctuations by means of a faster response of the reactive power differences is made possible.

What is claimed is:
1. A method for carrying out static reactive power compensation of a three phase system having a three phase load, a three phase capacitor battery and a three phase converter set having short circuited, controlled reactive power converters, by deriving the control variables for the reactive power converters from the load currents by steps comprising:
   a. converting the load current into a line frequency oscillation with orthogonal components;
   b. obtaining from each of the orthogonal components of the oscillation two components of a current vector rotating with the line frequency;
   c. developing a vector having two components from one phase of the three phase system;
   d. transforming the components of the current vectors into d-c quantities by adding to said components the components of said vector derived from one phase of the three phase system;
   e. developing from the d-c quantities a co-rotating vector and a counter-rotating vector each have an active and reactive component; and
   f. converting the components of the counter-rotating vector and the reactive component of the co-rotating vector into control variables for the individual reactive power converters.

2. The method according to claim 1 and further including the steps of:
   a. establishing maximum and minimum permissible current values;
   b. comparing said maximum and minimum values with the actual values of current;
   c. developing corrections factors therefrom when said values are exceeded; and
   d. multiplying said components of said counter-rotating vector and said reactive current component of said co-rotating vector by said correction factors.

3. A method for carrying out static reactive power compensation of a three phase system having a three phase load, a three phase capacitor battery and a three phase converter set having short circuited, controlled reactive power converters, by deriving the control variables for the reactive power converters from the load currents by steps comprising:
   a. converting the load current into a line frequency oscillation with orthogonal components;

b. obtaining from each of the orthogonal components of the oscillation two components of a current vector rotating with the line frequency;

c. developing a co-rotating vector and a counter rotating vector each having an active and reactive component from the components of said current vector;

d. developing a vector having two components from one phase of the three phase system;

e. transforming the orthogonal components of the co-rotating vector by addition to the components of said vector developed from one phase; and f. converting the components of the counter rotating vector after transformation and the reactive component of the co-rotating vector into control variables for the individual reactive power converters.

4. In a three phase system including a three phase load, a three phase capacitor battery and a three phase converter set with short circuited, controlled reactive power converters, apparatus for developing control variables for the reactive power converters from the load currents comprising:

a. means for detecting the load current in each of the three phases and providing outputs representative thereof;

b. coordinate transformer means having said load current outputs as inputs, for forming a line frequency oscillation with orthogonal components;

c. first and second vector identifier means, having as inputs the respective orthogonal component outputs of said coordinate transformer, for forming two current vectors rotating with the line frequency and providing outputs representing said two current vectors in the form of two orthogonal components for each vector;

d. means for developing two components of a system vector from the line voltage of one the phases of the three phase system;

e. first and second vector rotator means having as inputs the orthogonal component outputs of said first and second vector identifiers respectively, each having as second inputs the components outputs of said system vector means, for converting said component inputs into d-c quantities;

f. a with-and-against transformer for having as inputs the d-c component outputs of said vector rotators and forming therefrom and providing as outputs the components of a co-rotating vector and a counter-rotating vector; and g. a coordinate transformer having as inputs the outputs of said with-and-against transformer and forming therefrom and providing as outputs the control variables for the reactive power converter.

5. Apparatus according to claim 4 and further including:

a. first means having as input the control variables for each of the three phases and providing as an output the smallest of its inputs;

b. second means having as inputs said control variables and providing as an output the largest of its inputs;

c. third means for comparing the output of said first means with a predetermined minimum value and providing an output proportional to the difference therebetween;

d. fourth means for comparing the output of said second means with a predetermined, maximum value and providing an output proportional to the difference therebetween;

e. fifth means having the output of said third means as input and providing an output which is at a fixed level when the output of said first means is greater than said minimum predetermined value and which linearly decreases in proportion to the difference between said predetermined value and the output of said first means when the output of said first means is less than said predetermined value;

f. sixth means having as an input the output of said fourth means and providing an output which is at a fixed level as long as said second means output is less than said maximum predetermined values and which decreases linearly as a function of the difference between said maximum predetermined values and the output of said second means when the output of said second means exceeds said maximum predetermined value;

g. a first function generator having as an input the output of said fifth means;

h. a second function generator having as an input the output of said sixth means;

i. a third function generator having as an input the output of said fifth means;

j. a fourth function generator having as an input the output of said sixth means;

k. seventh means having as inputs the output of said first and second function generators and providing as an output the smallest of its inputs;

l. eighth means having as inputs the output of said third and fourth function generators and providing as an output the smallest of its two inputs;

m. a first multiplier interposed between said with-and-against transformer and said coordinate transformer coupling the reactive component of the co-rotating vector output of said with-and-against transformer to said coordinate transformer having as a multiplying input the output of said seventh means;

n. second and third multipliers similarly interposed and coupling the two components of said counter-rotating vector to said coordinate transformer and having as multiplying inputs the output of said eighth means.

6. Apparatus according to claim 4 and further including:

a. an additional identical arrangment including a second coordinate transformer third and fourth vector identifiers, third and fourth vector rotators and a second with-and-against transformer;

b. means for detecting the currents flowing in the respective controlled reactive power converters and providing them as inputs to the coordinate transformer of said further arrangement, said further arrangement providing as outputs the components of a counter-rotating reference vector;

c. means for subtracting the outputs of said additional arrangement from the corresponding outputs of the with-and-against transformer of said initial arrangement providing outputs proportional to said difference;

d. first, second and third component controllers having said respective differences as inputs; and e. first, second and third adding means having as respective inputs the outputs of said initial with-and-against transformer and the outputs of said first, second and third component controllers and providing their outputs as the inputs to coordinate transformer.

* * * * *